United States Patent
Bauder et al.

(10) Patent No.: US 7,635,429 B2
(45) Date of Patent: Dec. 22, 2009

(54) FLUID FILTER ELEMENT

(75) Inventors: Ralf Bauder, Ketsch (DE); Michael Wolf, Neunkirchen (DE); Karlheinz Muenkel, Oberderdingen-Flehingen (DE); Joachim Stinzendoerfer, Speyer (DE); Duc Cuong Nguyen, Laatzen (DE); Oliver Scherer, Reisbach (DE); Martin Gruber, Gangkofen (DE)

(73) Assignee: Mann + Hummel GmbH, Ludwigsburg (DE)

(*) Notice: Subject to any disclaimer, the term of this patent is extended or adjusted under 35 U.S.C. 154(b) by 70 days.

(21) Appl. No.: 11/521,298

(22) Filed: Sep. 15, 2006

(65) Prior Publication Data

US 2007/0090040 A1   Apr. 26, 2007

(30) Foreign Application Priority Data

Sep. 16, 2005   (DE)   .................. 20 2005 014 689 U

(51) Int. Cl.
*B01D 29/00* (2006.01)
(52) U.S. Cl. .................. 210/338; 210/450; 210/456; 210/493.1; 210/446; 184/6.24
(58) Field of Classification Search .................. 210/338
See application file for complete search history.

(56) References Cited

U.S. PATENT DOCUMENTS

| | | | | |
|---|---|---|---|---|
| 575,478 | A * | 1/1897 | Haefner | 210/338 |
| 1,840,153 | A * | 1/1932 | Bull | 210/342 |
| 3,361,260 | A * | 1/1968 | Buckman | 210/130 |
| 3,420,377 | A * | 1/1969 | Vandersip | 210/315 |
| 4,636,315 | A * | 1/1987 | Allen, Jr. | 210/656 |
| 6,171,486 | B1 * | 1/2001 | Green et al. | 210/198.2 |
| 6,361,690 | B1 * | 3/2002 | Bourgeois | 210/232 |
| 6,488,842 | B2 * | 12/2002 | Nagaoka | 210/136 |

(Continued)

FOREIGN PATENT DOCUMENTS

DE   30 46 179 A1   7/1982

(Continued)

OTHER PUBLICATIONS

European Search Report dated Oct. 31, 2006 with an English translation of the pertinent portion (seven (7) pages).

*Primary Examiner*—Walter D Griffin
*Assistant Examiner*—Denise R Anderson

(57) ABSTRACT

A compact filter element with a large filter surface area having inner and outer rings of filter material with an annular space between them, such that fluid to be filtered can be introduced into the annular space between the rings of filter material and a portion thereof can flow through the outer ring of filter material to the periphery of the filter element and another portion thereof can flow through the inner ring of filter material to the center of the filter element; at least one fluid-permeable support member for the filter material, and at least one end disk on an axial end face of the filter element affixed to the rings of filter material in a sealed manner, in which the end disk has a centrally arranged inlet opening for the fluid to be filtered and one or more radially extending distributor channels leading from the central inlet opening to at least one eccentrically arranged outlet opening which opens into the annular space between the rings of filter material to admit fluid to be filtered to the annular space.

13 Claims, 3 Drawing Sheets

U.S. PATENT DOCUMENTS

| | | |
|---|---|---|
| 6,565,745 B2* | 5/2003 | Hodgin et al. .......... 210/198.2 |
| 6,881,330 B2* | 4/2005 | Doyle et al. ............... 210/132 |
| 2002/0195387 A1 | 12/2002 | Donnerdal et al. |
| 2003/0038093 A1 | 2/2003 | Gershenson |
| 2003/0178351 A1* | 9/2003 | Doyle et al. ............... 210/131 |
| 2005/0056582 A1* | 3/2005 | Patel et al. .................. 210/266 |

FOREIGN PATENT DOCUMENTS

GB  2 046 613 A  11/1980

* cited by examiner

FLUID FILTER ELEMENT

BACKGROUND OF THE INVENTION

The present invention relates to a filter element for fluids which provides a large filter surface area in a compact volume.

Published German patent application no. DE 196 08 589 discloses a filter element for gaseous or liquid media which can be inserted into a filter housing. The filter element has a filter medium that is pleated in a zigzag pattern and closed to form a ring. End disks are arranged on the ends of the filter medium. Fluid flows through the filter element from the inside to the outside, so the particles of dirt striking the filter element form a filter cake on the surface of the filter element. This is understood to improve the filter fineness of the filter medium. In certain use situations, such filters may also be used without a housing, so an outer supporting jacket is needed for such an application. In the state of the art, this is accomplished by a perforated outer jacket. The outer jacket is made either of perforated sheet metal or a corresponding perforated plastic part.

To achieve especially large filter surface areas, it is necessary to utilize double rings of filter material having an annular space, arranged between the inner and outer rings of filter material. The annular space receives the oncoming flow of dirty fluid to be filtered, which makes it necessary to achieve an eccentric oncoming flow. This is accomplished by having an eccentrically positioned flow inlet opening. However, an eccentrically positioned inlet opening poses problems when connecting the filter element. To make it possible to effect a central connection, it is known in the art to use adapter plates which produce a re-direction or diversion of the flow. However, the increased structural height of such adapter plates is disadvantageous because it reduces the filter area and/or increases the installation space required for the filter element.

SUMMARY OF THE INVENTION

It is therefore an object of the invention to provide an improved fluid filter element which provides a large filter surface area in a compact volume.

Another object of the invention is to provide a fluid filter element which is simple and inexpensive to manufacture and offers maximum utilization of installation space.

These and other objects are achieved in accordance with the present invention by providing a filter element comprising inner and outer rings of filter material with an annular space between them, whereby a fluid to be filtered is introduced into the annular space between the rings of filter material and can flow through the outer ring of filter material to the periphery of the filter element and through the inner ring of filter material to the center of the filter element; at least one fluid-permeable support member for the filter material, and at least one end disk on an axial end face of the filter element affixed to the rings of filter material in a sealed manner, in which the end disk has a centrally arranged inlet opening for the fluid to be filtered and at least one eccentrically arranged outlet opening which opens into the annular space between the rings of filter material to admit fluid to be filtered to the annular space.

The filter element according to the invention is provided for cleaning fluids, in particular for coolant liquids, lubricant liquids or machining liquids from machine tools. The filter element has a filter medium and at least one end disk, with the filter medium having a cylindrical construction and comprising two rings of filter material. The rings of filter material may either be circular or have an oval configuration. The at least one end disk is attached in a sealing manner to the end faces of the filter medium, for example, by adhesively bonding or welding the end disk to the filter medium. At least one of the end disks is provided with an opening through which fluid can flow into and/or out of the interior of the filter element. The end disk may be made of plastic or metal. Filter elements having plastic end disks are advantageous because they may be disposed of completely in a special waste incinerator plant. In addition, end disks made of plastic will not corrode, so the filter element may also be used with problematical fluids.

In addition to the end disks and the filter medium, the filter element according to the invention also comprises at least one supporting body, which is arranged outside and/or inside the filter medium. Depending on the direction of flow, the filter medium may be supported by the support body or bodies, thereby preventing damage to the filter medium. Each supporting body is constructed as a hollow cylinder which is permeable to the fluid to be filtered. If desired, the support body or bodies may be connected to the end disks.

Between the two rings of filter material an annular space is formed, which receives oncoming flow of fluid to be filtered through the end disk. From this annular space, the fluid flows outwardly through the outer ring of filter material and, after having been cleaned by the filter material, downwardly along the outside of the filter element. The fluid also flows inwardly through the inner ring of filter material, going from there in clean form out of the hollow cylindrical clearance formed in the interior of the inner ring of filter material and being discharged through the lower end disk.

In accordance with the present invention, the fluid to be filtered flows through a centrally arranged inlet opening into the upper end disk, is conveyed through the end disk to an eccentrically arranged outlet opening, and flows from the eccentric outlet into the annular space between the two rings of filter material. Consequently, the filter element can be readily attached to given machine structures via the central inlet opening, without having to perform any complex external fluid diversion through an adapter that would take up interior space or a second end disk. This either results in a space saving smaller structural volume for the filter element or in an increased filter surface area within a filter element having a given structural volume. In addition, no additional measures for fluid diversion need be provided, so the process reliability is significantly increased by preventing leakage spots.

According to one advantageous embodiment of the invention, the end disk of the filter element comprises an essentially plate-shaped receiving part and an essentially channel-shaped distributor part. The plate-shaped receiving part is preferably circular in shape and/or follows the outside contour of the outer ring of filter material. The channel-shaped distributor part has a distributor channel, a fluid inlet arranged centrally in the channel and fluid outlet at the respective ends of the channel. The channel-shaped distributor part may be detachably or non-detachably connected to the plate-shaped receiving part in a sealed manner. The channel-shaped distributor part may be connected to the plate-shaped receiving part via a clip connection or a catch connection, but a glued joint or welded connection is also conceivable. Preferably, it is non-detachably connected to the plate-shaped receiving part via a glued joint. As used herein, the term "non-detachably" means that parts cannot be readily separated without destruction of one or more of the parts.

It is advantageous if the outlet opening formed by the end disk forms an annular ring channel, with the ring channel being arranged in the area of the annular space formed between the rings of filter material. The ring channel is formed in the end disk as an annular groove such that parts of the ring channel walls are formed by wall-shaped areas mounted on the channel-shaped distributor part. The ring channel walls thus have cut-away portions in the area of the distributor part into which the distributor part is inserted so that the ring channel wall is completed.

It also is advantageous if the channel-shaped distributor part is arranged in a corresponding receiving groove in the plate-shaped receiving part. The groove is arranged on the side of the plate-shaped receiving part facing the filter medium. The channel-shaped distributor part is thus inserted into the groove and detachably or nondetachably connected to the plate-shaped distributor part. The design of the groove and the distributor part is such that after the two parts are joined together, the end face of the end disk facing the filter medium forms two annular recesses which receive the inner and outer rings of filter material. In this embodiment, the end face which faces the filter medium is designed so that the bottoms of the two annular recesses have essentially the same height and/or depth with respect to one another. This assures that the two rings of filter material, which are received in the recesses and secured to the end disk, may have the same height. This advantageously eliminates any need for synchronization of the fabrication of two rings of filter material and/or an interposition of rings of filter material having different lengths.

In another embodiment of the invention, a layer of adhesive material is applied to the annular recesses formed on the end face of the end disk for receiving the rings of filter material after insertion of the distributor channel, and then the rings of filter material are adhesively bonded to the end disk, and at the same time the distributor channel is glued tightly to the end disk. The ensures a simple and inexpensive as well as reliable way of assembling the end disk including the channel-shaped distributor part and the rings of filter material.

The plate-shaped receiving part and the channel-shaped distributor part are advantageously made of a thermoplastic synthetic resin material by an injection molding process. Examples of suitable synthetic resin materials which may be used include polypropylene or polyamide.

Alternatively, the end disk may also be manufactured in one piece by an gas internal pressure process (GID) in which the thermoplastic end disk is first manufactured by an injection molding process, and immediately thereafter, a gas, preferably nitrogen, is injected into the hot plastic melt through a gas injection nozzle. In this way, the hot melt in the core of the part can be displaced by the nitrogen to form the desired channels. The paths of the channels can be defined by appropriate specifications in the design of the injection molding tool in a manner known in the injection molding art. This is accomplished by designing the end disk in such a way that the thermoplastic synthetic resin material solidifies last in the area of the desired channels, so that hot plastic melt yet to be displaced is still present in the desired channel location immediately after the injection molding process. This yields the great advantage that a one-piece end disk is obtained but nevertheless it does not take up any additional installation space.

In accordance with one advantageous embodiment of the end disk produced by the gas internal pressure process, the inlet opening of the end disk opens into a receiving space which has openings to distributor channels. The distributor channels extend radially outwardly to the annular space between the inner and outer rings of filter material, where they then open into outlet openings protruding axially into the annular space. The distributor channels are preferably distributed uniformly around the circumference of the end disk. Preferably, the number of distributor channels will range from 3 to 8. However, depending on the desired quantity of fluid throughput, it is also possible without any difficulty through this process to provide a greater or lesser number of distributor channels in the end disk.

It is especially advantageous if the distributor channels extend within in the interior of the plate-shaped and disk such that the end face of the end disk facing the filter medium forms an essentially planar surface. This makes it possible to achieve the result that the two rings of filter material may assume the same height, and it is therefore unnecessary to synchronize the fabrication of two rings of filter material having different heights. Preferably, the recesses are included within a rib structure of the thermoplastic end disk.

In accordance with one advantageous embodiment, the support tube is manufactured of a thermoplastic material, in particular a polyamide, by an injection molding process. Due to this type of manufacturing, an especially inexpensive production is assured, which additionally includes the advantage of an easy and simple design.

In one advantageous embodiment of this invention, the filter medium has zig-zag pleats and is closed to form a ring. Due to the zig-zag pleating of the filter medium, the filter element has the largest possible surface area available for filtration.

In one specific embodiment of this invention, the filter element is provided for cleaning a dielectric fluid from an electric discharge machining or electric discharge wire cutting machine. Machines of this type produce very small particles, which are then transported away from the workpiece being machined with the dielectric medium. To achieve optimum functionality of the dielectric, the very small particles must be filtered out from the very beginning of operations, because otherwise the efficacy of the machining operation is reduced. Therefore, a high initial degree of separation is important.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
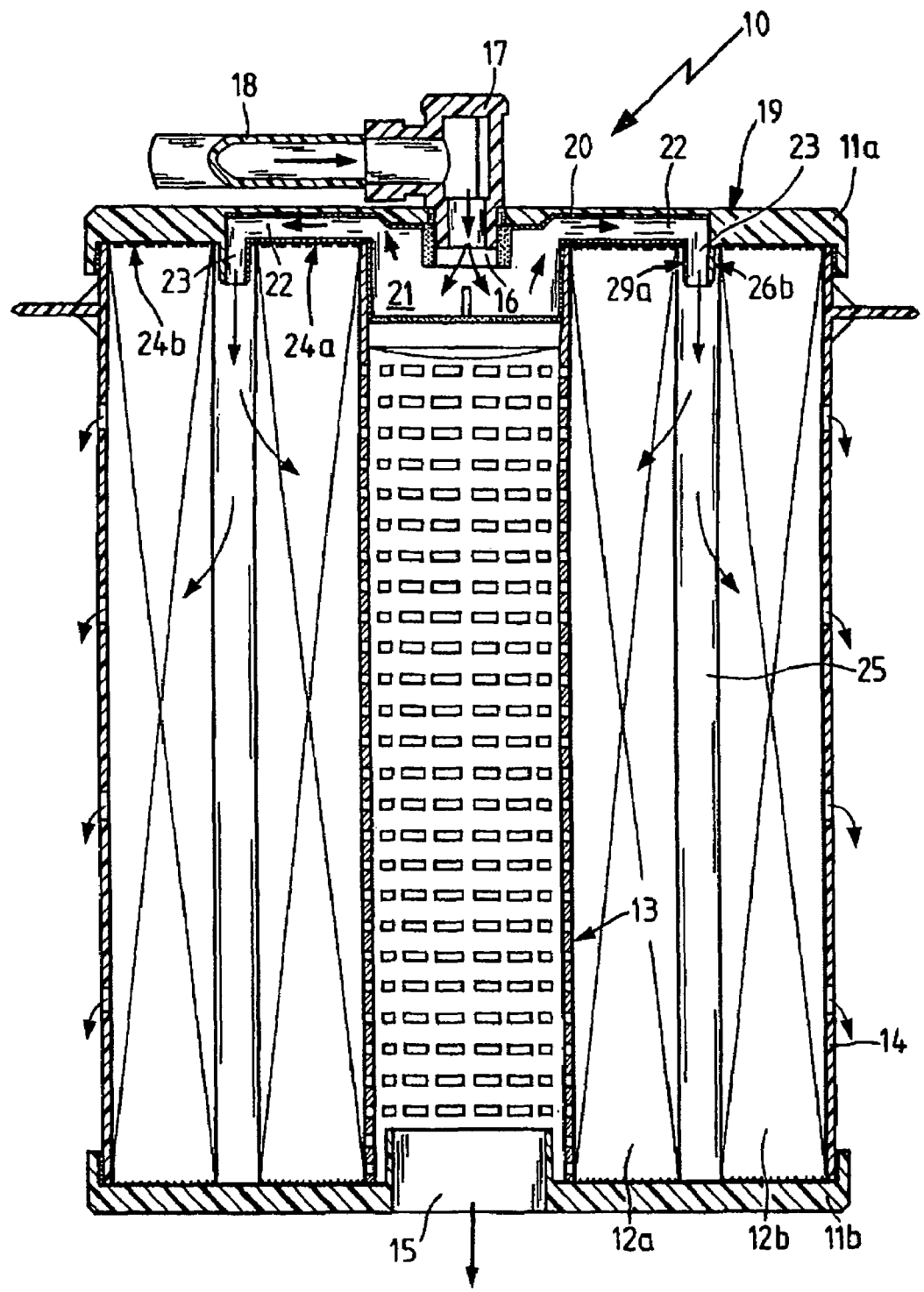
FIG. 1 is a sectional view of a filter element constructed in accordance with the invention.

FIG. 1 shows a filter element 10 for fluids, in particular coolant, lubricant or machining liquids from machine tools. The filter element comprises an upper end disk 11*a* and a lower end disk 11*b* between which an inner ring of filter material 12a and an outer ring of filter material 12b are arranged in a sealed manner. The rings of filter material 12a and 12b have a closed hollow cylindrical construction, and preferably comprise a pleated or zig-zag folded filter medium.

An inner supporting tube 13 is situated inside of the inner ring of filter material 12a, and an outer supporting tube 14 is arranged as a jacket around the outer ring of filter material 12b. The support tubes 13 and 14 are preferably made of a synthetic resin material by an injection molding process or an extrusion process and are fluid-permeable. The support tubes 13 and 14 are preferably non-detachably joined to the end disks 11a, 11b by a bonding or welding method.

The lower end disk 11b has a centrally arranged fluid outlet 15. The upper end disk 11a has a fluid inlet 16 which is also centrally situated and is connected via a connecting nipple 17 to a supply line 18 for the fluid to be filtered. The end disk 11a is divided into a plate-shaped receiving part 19 and a channel-shaped distributor part 20. The fluid to be cleaned flows through the supply line 18 and the connecting nipple 17 into the fluid inlet 16, from whence it flows into a cup-shaped receiving space 21. The fluid to be cleaned is conveyed further from receiving space 21 through distributor channels 22 into an outlet ring channel 23. The fluid to be cleaned then flows out of the outlet ring channel 23 into an annular space 25 between the two rings of filter material 12a and 12b.

A portion of the fluid passes from annular space 25 radially inwardly through the inner ring of filter material 12a, where it is cleaned, and thence through the fluid-permeable inner support tube 13 to emerge again through the fluid outlet 15 of the lower end disk 11b as cleaned fluid. In addition, another portion of the fluid flows from annular space 25 radially outwardly through the outer ring of filter material 12b, and, having been cleaned, then passes through the outer support tube 14 and runs down along the outside of the filter element into a receiving basin (not shown).

Due to the design of the receiving space 21 and the outlet ring channel 23, two additional annular recesses 24a and 24b, which receive the rings of filter material 12a and 12b, respectively, are formed on the side of the end disk 11a facing the rings of filter material 12a and 12b. Since the distributor channel 22 is completely integrated into the plate-shaped receiving part 19, this yields identical heights for the two annular recesses 24a, 24b, so the two rings of filter material can also be designed to be the same height.

Figure 2:
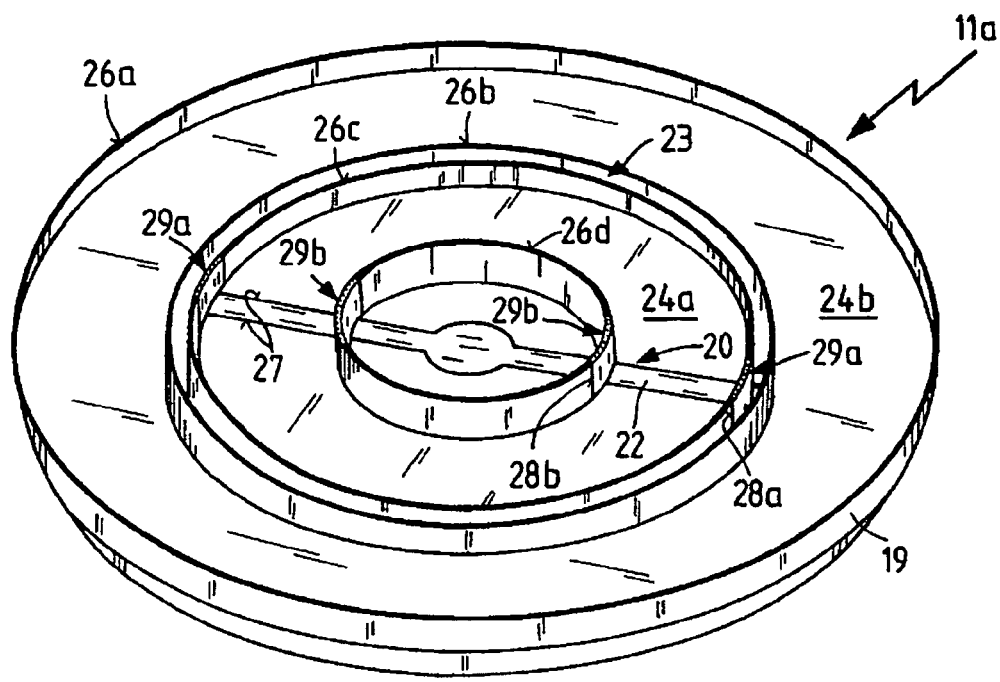
FIG. 2 is an isometric view of a filter element end disk according to the invention.

FIG. 2 is an isometric view of the upper end disk 11a. Components corresponding to FIG. 1 are identified by the same reference numerals. Here, the plate-shaped receiving part 19 of the upper end disk 11a has a receiving groove 27 to receive the distributor channel 22. The annular recesses 24a and 24b for receiving the rings of filter material 12a and 12b and the outlet ring channel 23 are formed by circular ring-shaped channel walls 26a-d.

The inner channel wall 26c of the outlet ring channel 23 and the adjacent channel wall 26d of the annular recess 24a have cut-away portions 28a, 28b in the path of the receiving groove 27. The distributor channel 22 has wall segments 29a, 29b which correspond to these cut-away portions 28a, 28b and extend axially from the distributor channel 22 in the direction of the rings of filter material 12a, 12b. The receiving groove 27 accommodates the actual distributor channel 22 completely in the plate-shaped receiving part 19 of the end disk 11a, and the wall segments 29a, 29b complete the channel walls 26c, 26d by filling in the cut-away portions 28a, 28b.

After inserting the distributor channel 22 into the plate-shaped receiving part 19 of the end disk 11a, an adhesive is applied to the bottoms of the annular recesses 24a and 24b.

Then the end disk 11a is bonded to the rings of filter material 12a, 12b. The distributor channel 22 is thereby inseparably attached to the end disk 11a.

Figure 3:
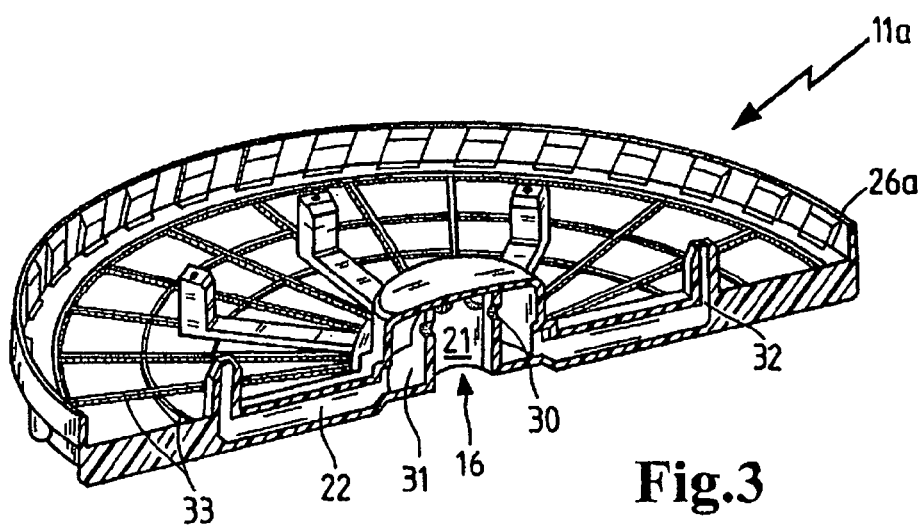
FIG. 3 is a sectional view through an alternate embodiment of a filter element end disk according to the present invention.

FIG. 3 shows a sectional perspective view of an alternative embodiment of an end disk 11a. Again, components corresponding to the previous figures are identified by the same reference numerals. In this case, the end disk 11a is manufactured in one piece by the gas internal pressure (GID) method, so that the distributor channels 22 are integrated into the end disk 11a.

As in the preceding embodiment, the end disk has a fluid inlet 16 which opens into a receiving space 21. Receiving space 21 has several boreholes 30 distributed around the circumference on the end facing the filter medium, these boreholes in turn opening into an annular chamber 31. The distributor channels 22 emanating from this annular chamber 31 are arranged distributed uniformly in the end disk 11a and open into outlet openings 32 which extend axially into the annular space 25. The distributor channels 22 are constructed with additional reinforcing ribs 33.

The end disk 11a is manufactured by an injection molding process specially designed such that the plastic melt inside the distributor channels remains molten for a longer period of time, so that by internal application of a gas pressure, the still molten synthetic resin material can be forced out, thereby forming channels and flow paths in the end disk.

Figure 4:
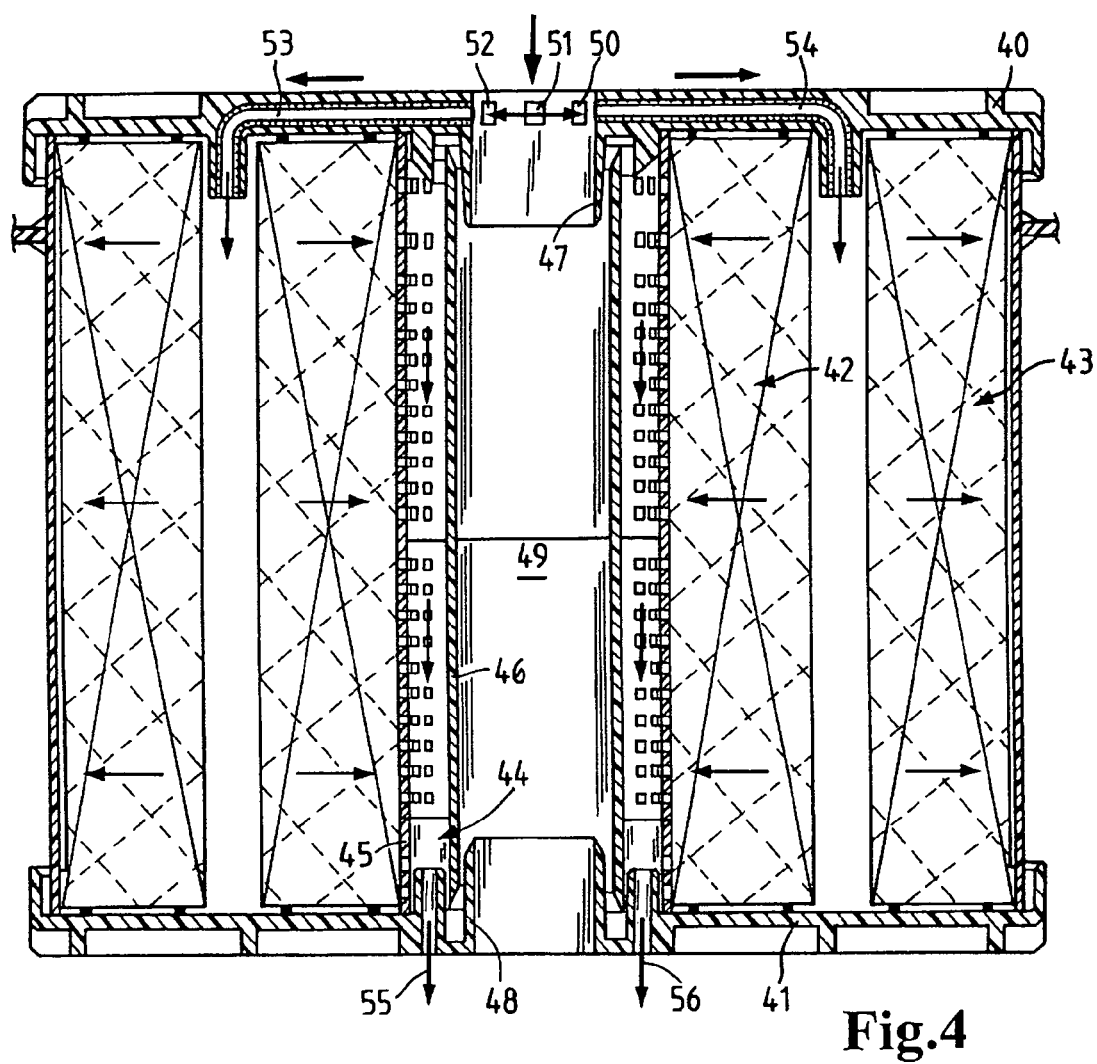
FIG. 4 is a sectional view through yet another embodiment of a filter element according to the invention.

FIG. 4 is a sectional view of another embodiment of a filter element according to the invention comprising an upper end disk 40, a lower end disk 41 and an inner ring of filter material 42 and outer ring of filter material 43 arranged in a sealed manner between the upper and lower end disks. The rings of filter material are constructed as illustrated in FIG. 1.

Inside the inner ring of filter material 42 there is a supporting system 44 comprising a perforated outer support tube 45 and a closed inner support tube 46. A connecting flange 47, 48 is provided on each of the two end disks 40, 41. These two connecting flanges serve to receive a mandrel (not shown). The mandrel is sealed via flat gaskets relative to one or both end disks 40, 41 of the filter element.

The medium to be filtered passes centrally through this mandrel, which has holes in its wall. The medium to be cleaned flows through these holes into the interior space 49 and passes from there through holes 50, 51, 52 to the distributor channels 53 and 54, from where the fluid is introduced between the inner ring of filter material and the outer ring of filter material. The fluid is filtered by the rings of filter medium and flows as indicated by the arrows through the outer ring of filter material and down along the outer circumference of the filter element and through the inner ring of filter material and downwardly through the double-walled support system 44. Openings 55 and 56 are provided in the area of the end disk 41, through which the cleaned fluid can flow out of the filter element.

The advantage of the filter element shown here is that it can be installed as a compact element into an existing filter system, in which case only the connecting mandrel and the connections for the filtered fluid need be taken into account with regard to the installation situation.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter element comprising
   inner and outer rings of filter material with an annular space between them, whereby a fluid to be filtered is introduced into the annular space between the rings of filter material and can flow through the outer ring of filter material to the periphery of the filter element and through the inner ring of filter material to the center of the filter element;
   at least one fluid-permeable support member for the filter material, and
   at least one end disk on an axial end face of the filter element affixed to the rings of filter material in a sealed manner,
   wherein said end disk is a one-piece molded synthetic resin material part manufactured from a thermoplastic synthetic resin material by injection molding;
      said one-piece end disk having a centrally arranged inlet opening into a receiving space for the fluid to be filtered and
      a plurality of elongated fluid distribution channels extending radially from said receiving space to the annular space between the inner and outer rings of filter material and then protruding axially from the end disk into the annular space, each of said elongated channels ending in an eccentrically arranged outlet opening which opens into the annular space between the rings of filter material to admit fluid to be filtered to said annular space.

2. A filter element according to claim 1, wherein the end face of the end disk facing the rings of the filter material forms two annular recesses for receiving the inner and outer rings of filter material, said annular recesses having bottoms with essentially equal heights.

3. A filter element according to claim 1, wherein the inner and outer rings of filter material are bonded to the end disk by a layer of adhesive.

4. A filter element according to claim 1, wherein the radially extending and axially protruding fluid distribution channels between the fluid inlet and the fluid outlets are formed by a gas internal pressure process.

5. A filter element according to claim 1, wherein the distributor channels are formed interiorly in the end disk such that the end face of the end disk which faces the rings of filter material has a substantially flat surface.

6. A filter element according to claim 1, wherein the support member is manufactured from a thermoplastic synthetic resin material by injection molding.

7. A filter element according to claim 6, wherein the synthetic resin material is a polyamide.

8. A filter element according to claim 1, wherein the filter material is pleated in zigzag pleats.

9. A filter element according to claim 1, comprising a second end disk on the axial end of the filter element opposite said at least one end disk.

10. A filter element according to claim 1, wherein the at least one permeable support member comprises a first perforated support tube disposed radially inside the inner ring of filter material and a second perforated support tube disposed radially outside the outer ring of filter material.

11. A filter element according to claim 1, wherein the filter element is connected to a dielectric fluid circuit of an electric discharge machining tool or an electric discharge wire cutting machine.

12. A filter element according to claim 1, wherein said filter element is connected to a coolant, lubricant or machining liquid circuit of a machine tool.

13. A filter element comprising:
   inner and outer rings of filter material with an annular space between them, whereby a fluid to be filtered is introduced into said annular space between said rings of filter material and can flow through said outer ring of filter material to a periphery of said filter element and through said inner ring of filter material to a center of said filter element;
   at least one fluid-permeable support member for said filter material, and
   at least one end disk on an axial end face of said filter element affixed to said rings of filter material in a sealed manner, at least one of said end disks defining a centrally positioned receiving space configured to receive said fluid to be filter and an annular chamber circumferentially surrounding said receiving space and separated from said receiving space by a wall having a plurality of bore holes therethrough configured for passage of said fluid from said receiving space to said annular chamber,
   wherein said end disk is a one-piece molded synthetic resin material part manufactured from a thermoplastic synthetic resin material by injection molding, said one-piece end disk having a plurality of elongated fluid distribution channels extending radially from said annular chamber to said annular space between said inner and outer rings of filter material, said elongated channels protruding axially from said end disk into said annular space, each of said elongated channels ending in an eccentrically arranged outlet opening which opens into said annular space between said rings of filter material to admit fluid to be filtered into said annular space,
   wherein said one-piece end disk reduces structural height of said end disk, increasing installation space for said filter material in said filter element.

* * * * *